(12) United States Patent
Saha et al.

(10) Patent No.: US 7,606,981 B2
(45) Date of Patent: Oct. 20, 2009

(54) SYSTEM AND METHOD FOR REDUCING STORE LATENCY

(75) Inventors: Bratin Saha, San Jose, CA (US); Hariharan L. Thantry, Santa Clara, CA (US); Ali-Reza Adl-Tabatabai, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 593 days.

(21) Appl. No.: 11/311,751

(22) Filed: Dec. 19, 2005

(65) Prior Publication Data

US 2007/0143549 A1 Jun. 21, 2007

(51) Int. Cl.
*G06F 12/00* (2006.01)
(52) U.S. Cl. .................. 711/145; 711/154; 711/156; 711/207

(58) Field of Classification Search .............. 711/145, 711/154, 156, 207
See application file for complete search history.

(56) References Cited

U.S. PATENT DOCUMENTS

| | | | |
|---|---|---|---|
| 6,009,488 A | 12/1999 | Kavipurapu | |
| 6,868,485 B1* | 3/2005 | Conway | 711/154 |
| 7,096,323 B1* | 8/2006 | Conway et al. | 711/147 |
| 7,373,466 B1* | 5/2008 | Conway | 711/156 |
| 2005/0055502 A1* | 3/2005 | Hass et al. | 711/122 |

* cited by examiner

*Primary Examiner*—Stephen C Elmore
(74) *Attorney, Agent, or Firm*—Blakely, Sokoloff, Taylor & Zafman LLP

(57) ABSTRACT

According to one embodiment of the invention, a method comprises verifying that a cache block is not exclusively owned, and if not, transmitting a message identifying both the cache block and a caching agent requesting ownership of the cache block to a broadcast interconnect.

18 Claims, 5 Drawing Sheets

SYSTEM AND METHOD FOR REDUCING STORE LATENCY

FIELD

Embodiments of the invention relate to the field of data communications, and more particularly to an optimized STORE protocol conducted over a broadcast-style interconnect.

GENERAL BACKGROUND

Currently, many electronic systems comprise one or more processors linked to a main memory by a bus or other type of interconnect. The main memory is arranged to organize information being stored, such as instructions and/or data for example, into blocks. Each "block" is separately addressable and may be of a fixed size of bytes. Information is typically moved about the multiprocessor system in units of blocks.

In theory, processors within a multiprocessor system are adapted to retrieve one or more blocks of information from the main memory, perform operations on such information, and eventually return the results back to main memory. However, retrieving information from main memory can take a significant amount of time, especially in light of the high operating speeds of modern processors.

To reduce such latencies, however, modern processors rely on one or more cache memories (hereinafter referred to as "caches"). A cache is a small, fast memory module that is placed in close proximity to a processor and is used to store information that the processor is currently using or is likely to use in the near future.

Because more than one processor of the multiprocessor system may request a copy of the same block of information, cache coherency protocols have been developed to ensure that no processor relies on a "stale" block, namely a block of information that is currently incorrect due to modifications or updates performed to the block by some other processor. One type of cache coherency protocol is a distributed directory-based protocol, where the multiprocessor system includes directories that are each used to store protocol state information pertaining to a range of blocks of memory. Examples of protocol state information include "Shared" (S), "Invalid" (I) and "Modified" (M) state values per standard MESI protocol.

A common technique employed in many multiprocessor systems utilizing a broadcast protocol is to not maintain directory entries for blocks in the Shared (S) state. Rather, only entries for blocks in the Modified (M) state are maintained. If a processor requires exclusive access for a cache block (e.g., for a STORE operation), and the block does not have a directory entry, then the STORE protocol involves the sending of an invalidation message (INVAL) out to all of the processors on a the ring interconnect to ensure that any shared copies of the cache block are placed in an 'I' state.

For instance, as shown in FIG. 1, for this STORE flow operation, if a CPU/cache complex 100 wants to store information into a cache block that it does not currently own, a WRITE REQUEST message 110 is transmitted. WRITE REQUEST message 110 is represented by "WRITREQ[BID][NID]," where the term "BID" 112 represents an identifier of the requested cache block and "NID" 114 represents a network identifier of CPU/cache complex 100 requesting Modified (exclusive) access to the cache block.

The WRITEREQ message 110 is received by a "Home node" 120, namely the node having access to a directory that knows the state of the requested cache block. Home node 120, which is determined to have a specific protocol engine (PE) such as "PE5," performs a look-up of directory for an entry associated with the requested cache block. If a directory entry for the cache block does not exist, meaning that the block is not exclusively owned, an Invalidate message 130 (INVAL [BID, ALL]) is sent out on the interconnect to all of the nodes to invalidate the block if it exists in their cache. The reason is that the block may exist in the 'S' state in any of the caching agents.

Invalidate message 130 takes a known fixed duration on a broadcast style interconnect like ring for all of the nodes on the interconnect to observe. The fixed duration would be equal to $N*T+(N+M-1)*T'$ cycles, where "N" is the number of CPU/cache complexes, "T" is the time (cycles) taken to process each message excluding decode time, "M" is the number of PE/directory nodes, and "T'" the time for "decode only" operations.

After expiration of $N*T+(N+M-1)*T'$ cycles, Home Node 120 issues a Write Acknowledgement (WRITEACK[BID, NID]) message 140 to grant ownership of the block to CPU/cache complex 100 identified by "NID". This takes "kT'" time, where "k" is the hop distance from the Home Node to the requesting agent. Hence, the complete transaction time is set forth in equation (1) and the worst case/best case time delays from observation of the Invalidate message to actual ownership by CPU/cache complex 100 is set forth in equations (2, 3) respectively.

$$N*T+(N+M-1)*T'+k*T' \qquad (1)$$

$$(N+M-k-1)*T+(N+M-k-1)*T'+k*T'(\text{Worst}) \qquad (2)$$

$$(N+M-k-1)*T'+k*T'(\text{Best}) \qquad (3)$$

An average case analysis for these times assuming "k" varies from 1 to N would yield the time periods set forth in equations (4) and (5) set forth below.

Average time for complete transaction (from INVAL issue) would be computed as shown in equation (4):

$$N*T+(N+M-1)*T'+1/N*\sum_{k=1}^{N+M-1} kT' = \qquad (4)$$

$$N*T+(N+M-1)*T'+(1/N)*0.5*(N+M)*(N+M-1)*T'$$

An Average time for Read For Ownership "RFO" (from INVAL observation to ownership) would be computed as shown in equation (5):

$$1/N*\left[\sum_{k=1}^{N+M-1}(N+M-1-k)*T'+\sum_{k=0}^{N-1}kT+\sum_{k=1}^{N+M-1}kT'\right]= \qquad (5)$$

$$(N+M-1)/(N)*[(0.5)*(N-1)*(N)*T]$$

In addition, the approximate total cost for barrier synchronization, where all N processors participate, and follow a total schedule where the cache block representing the barrier is assumed to be not present initially in any of the private caches, and follows the state transition I−>M (ownership)−>S(test for barrier), and then repeatedly from S−>I−>S, until all processors have reached the "barrier" point, is provided below in equation (6):

Equation (6):

$$\text{Total Cost} = N*N*T + N*(N+M-1)*T' + \sum_{K=1}^{N+M-1} k*t$$

Or, Total Cost =

$$N*N*T + N*(N+M-1)*T' + ((N+M-1)(N+M)*T')/2$$

$$\text{Total Cost} = N*N*T + 0.5(N+M-1)*(3N+M)*T'.$$

BRIEF DESCRIPTION OF THE DRAWINGS

Embodiments of the invention may best be understood by referring to the following description and accompanying drawings that are used to illustrate various features of the embodiments of the invention.

DETAILED DESCRIPTION

Herein, certain embodiments of the invention relate to a system and method for optimizing the STORE protocol in a broadcast-style interconnect. The optimized STORE protocol reduces the average time, assuming uniform random request pattern, for a Read for Ownership (RFO) by (N+M−1)/(N)*[1−0.5(N+M)]*T' cycles, where "N" is of the number of processor nodes, "M" is the number of directory nodes and "T'" is equal to the approximate amount of time delay realized by a node to "decode" a header of the INVALIDATE message. The "RFO" is the time period from detection of an INVALIDATE message by a caching agent until ownership of a requested block of information by the caching agent. We assume that the total time for a single INVAL message to propagate around the broadcast interconnect is NT+(N+M)T'

According to one embodiment of the invention, the STORE protocol is optimized by reducing the amount of time for a node to acquire ownership of a block of information and making this time independent of the position of the node along (or within the coverage area of) the broadcast-style interconnect. According to another embodiment of the invention, the optimized STORE protocol generally involves a merging of the functionality between prior Invalidate and Write Acknowledgement messages.

For instance, according to one embodiment of the invention, INVALIDATE message will now carry a block identifier (BID) and a node identifier (NID). That is, the INVALIDATE message is configured to include NID, which identifies the requesting node that has been granted ownership of a requested block of information. Since all participating nodes examine the INVALIDATE message routed over a broadcast interconnect, this optimization informs the participating nodes what specific node has been granted ownership of a particular block of information. This reduces the number of messages placed on the broadcast interconnect and also reduces the latency of granting ownership.

Figure 1:
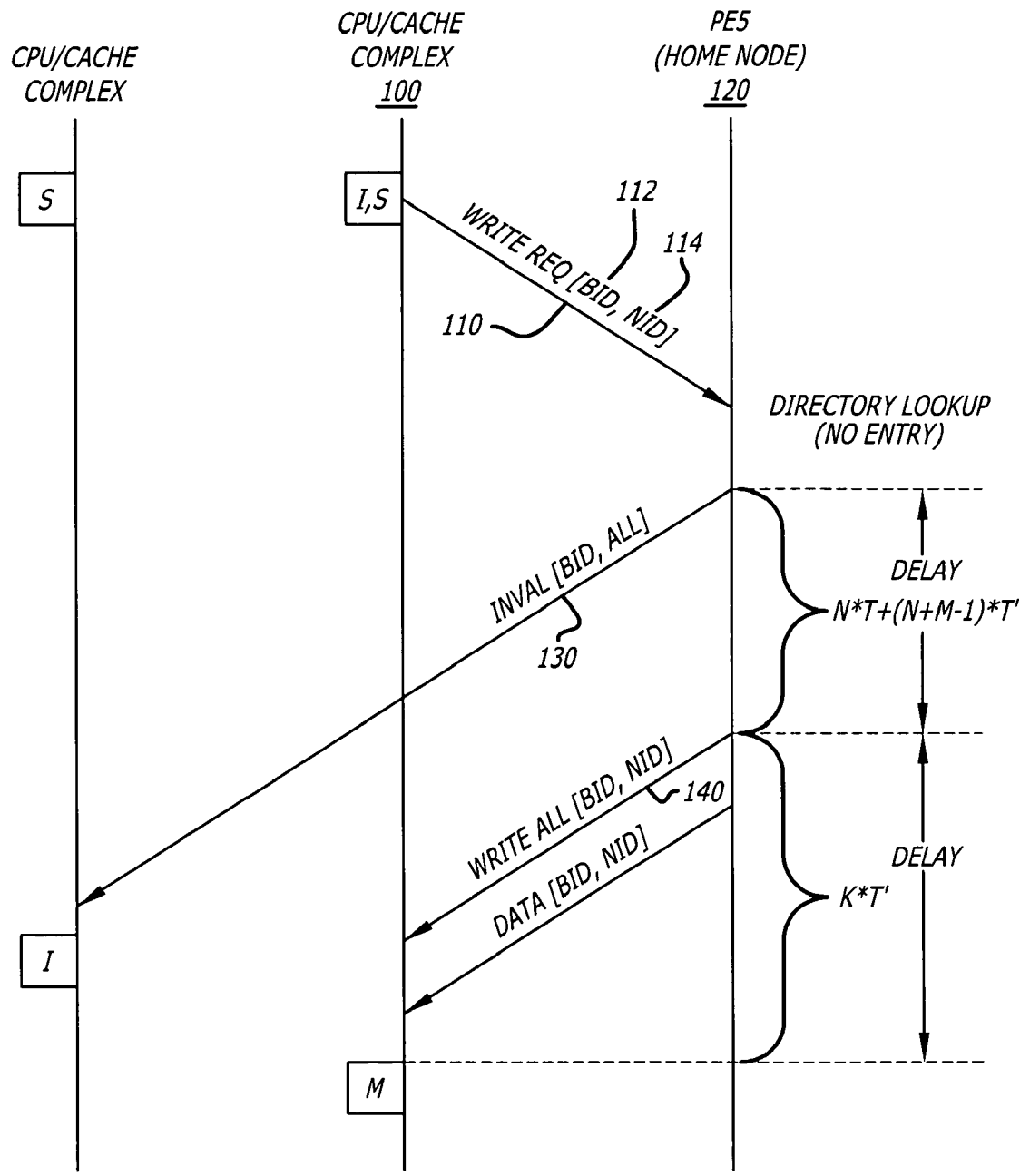
FIG. 1 is a block diagram of the system in accordance with the conventional STORE protocol.

In the original protocol, Invalidate message 130 of FIG. 1 ensures that no cache has the block in a Shared (S) state. Hence, upon receiving the Write Acknowledgement message 140 of FIG. 1, the requestor has ownership of the block. Therefore, previously, the total time before a requestor gets ownership of the block is (N*T)+(N+M−1)*T'+(k*T') for a wired interconnect. Herein, "N" is equal to the total number of caching agents, "M" is equal to the total number of non-caching agents such as directory nodes, "T" is the delay realized for processing a message (excluding decode), "T'" is the delay realized for decode operations by any of the nodes, and "k" is the number of nodes connected to the interconnect between the requestor and the Home node (1≦k≦N+M−1).

In the optimized protocol, however, the caching agent that has been granted ownership of the block receives an INVALIDATE message after a set number of cycles as set forth in equation (7):

$$\frac{1}{N}\left[\sum_{k=1}^{N+M-1} K*T^1 + \sum_{k=1}^{N-1} K*T\right] \quad (7)$$

Thereafter, the caching agent waits until an INVALIDATE message is received by all of the other nodes on the broadcast interconnect. A maximum (RFO) wait time would be (N+M−k−1)*T+(N+M−k−1)*T' cycles before assuming that it has ownership of the block, where all of the remaining nodes connected to the broadcast interconnect are caching agents. A minimum wait time would be (N+M−k−1)*T' cycles if all of the remaining nodes around the broadcast interconnect are non-caching agents. Therefore, according to the optimized STORE protocol, the total time before a requestor gets ownership of the block is (N*T)+(N+M−1)*T'.

In the following description, certain terminology is used to describe features of the invention. For example, the term "node" is any component including a protocol engine that is coupled to a broadcast interconnect. A "broadcast interconnect" is generally defined as an information-carrying medium featuring any topology where a message from one node can be observed by all of the other nodes coupled to this interconnect in a bounded duration of time. The broadcast interconnect may be a wired physical medium such as a ring interconnect (e.g. Tukwila ring interconnect), a front-side bus or the like. Alternatively, the broadcast interconnect may be a wireless medium having functionality similar to a ring interconnect or front-side bus.

A "message" is broadly defined as information placed in a predetermined format for transmission over a broadcast interconnect from a first node to a second node. A "block" is a predetermined amount of memory treated as a unit of information. Typically, the block may be one or more cache lines in size.

The term "processor/cache complex" is generally defined as a type of node that comprises a processor operating in combination with a protocol engine (PE) and one or more dedicated cache memories to process information. The "protocol engine" operates as an Open Systems Interconnection (OSI) Data Link layer that is in communication with the broadcast interconnect, controls the transmission and reception of messages and is responsible for determining what operations are necessary in response to these messages. According to one embodiment of the invention, the protocol engine is hardware operating as a state machine.

In the following description, numerous specific details are set forth. However, it is understood that embodiments of the invention may be practiced without these specific details. For instance, the updating of the directory is not described in detail to avoid obscuring the invention. Moreover, in other instances, well-known circuits, structures and techniques have not been shown or described in detail in order not to obscure the understanding of this description.

A. Optimized Store Protocol—Latency Reduction

Figure 2:
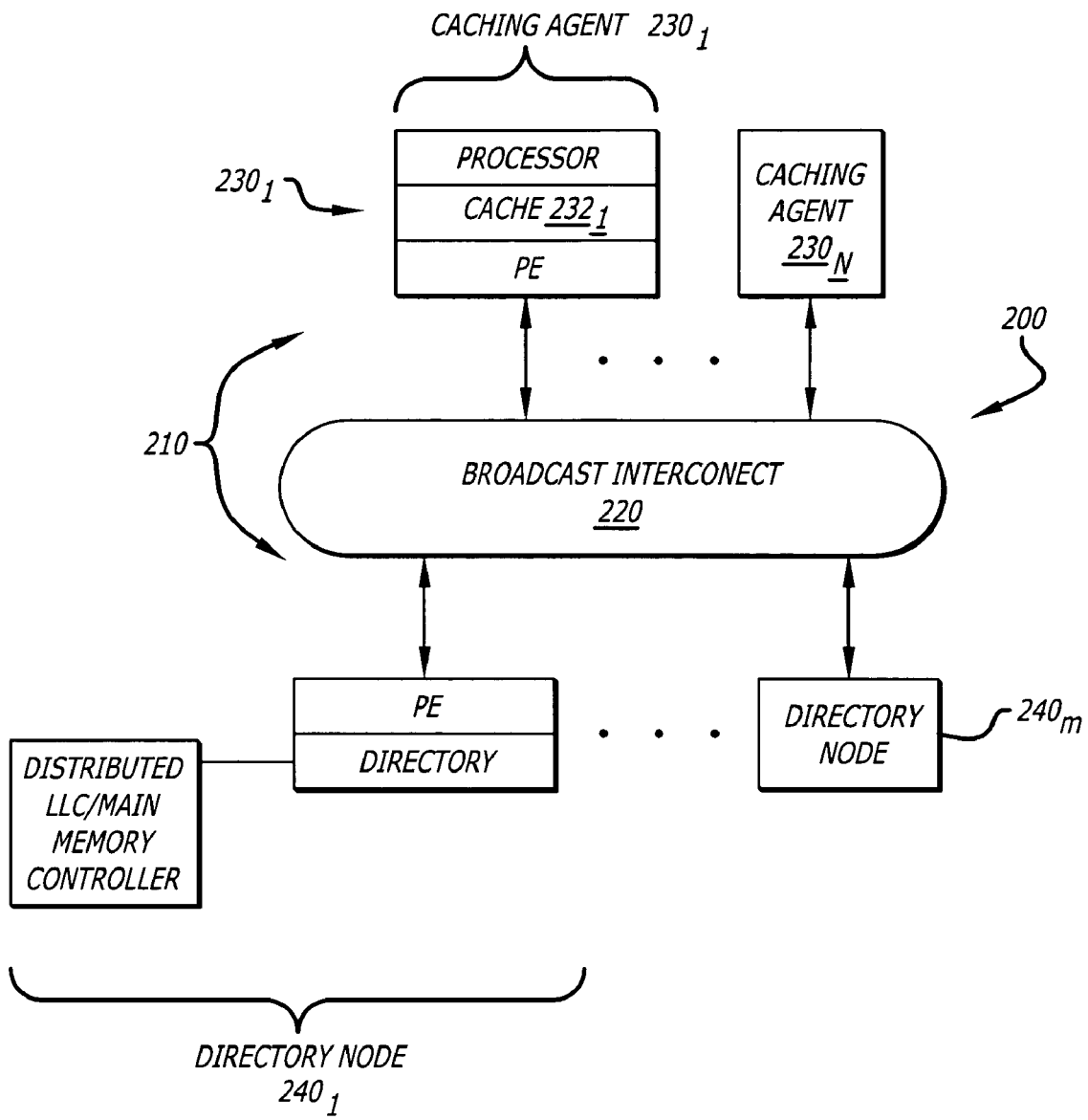
FIG. 2 is an exemplary block diagram of a system operating in accordance with one embodiment of the invention.

Referring to FIG. 2, an exemplary block diagram of a system 200 in accordance with one embodiment of the invention is shown. Herein, system 200 may be a multiprocessor system representing a variety of platforms. For instance, system 200 may be associated with a desktop or mobile computer, a server, a set-top box, any type of wired or wireless communication device, or the like.

According to this embodiment of the invention, system 200 may include a plurality of nodes 210 in communication with each other over a broadcast interconnect 220. These nodes 210 may include, but are not limited or restricted to (i) one or more caching agents $230_1$-$230_N$ (e.g., N≧1), namely one or more components with a private memory (e.g., cache) such as processor/cache complexes, and (ii) one or more distributed directory nodes $240_1$-$240_M$ (e.g., M≧1) described below.

As shown, each caching agent (e.g., caching agent $230_1$) is configured to perform a STORE operation where cache $232_1$ is granted ownership of a block of information (also referred to as a "cache block") and caching agent $230_1$ performs a sequence of operations in order to gain exclusive ownership of the cache block in the absence of ownership of this cache block by another caching agent. The sequence of operations is referred to as a "STORE flow".

In general, the STORE flow commences once caching agent $230_1$ wants to store information into a cache block that it does not currently own. Caching agent $230_1$ initiates a first message to one of the distributed directory nodes $240_1$-$240_M$ (e.g., distributed directory node $240_1$) that is responsible for verifying that the requested cache block is not currently owned. For illustrative purposes, distributed directory node $240_1$ is referred to as the "Home node," namely the node featuring a directory that considered to know the state of the requested cache block.

In response to such verification, assuming the verification passes, a second message is transmitted from the "Home node" over a first channel for observation by all of the caching agents in communication with the broadcast interconnect. In contrast with prior STORE protocols, the second message includes the identifier of the caching agent that initiated the first message and the identifier of the requested cache block. The inclusion of the identifier of the caching agent results in a reduced number of messages and reduces the overall latency of the Store protocol as described below. In addition, a third message (e.g., DATA[BID,NID]) is transmitted that places the most current version of the cache block obtained by a memory controller on a second channel for storage within the requesting caching agent.

Figure 4:
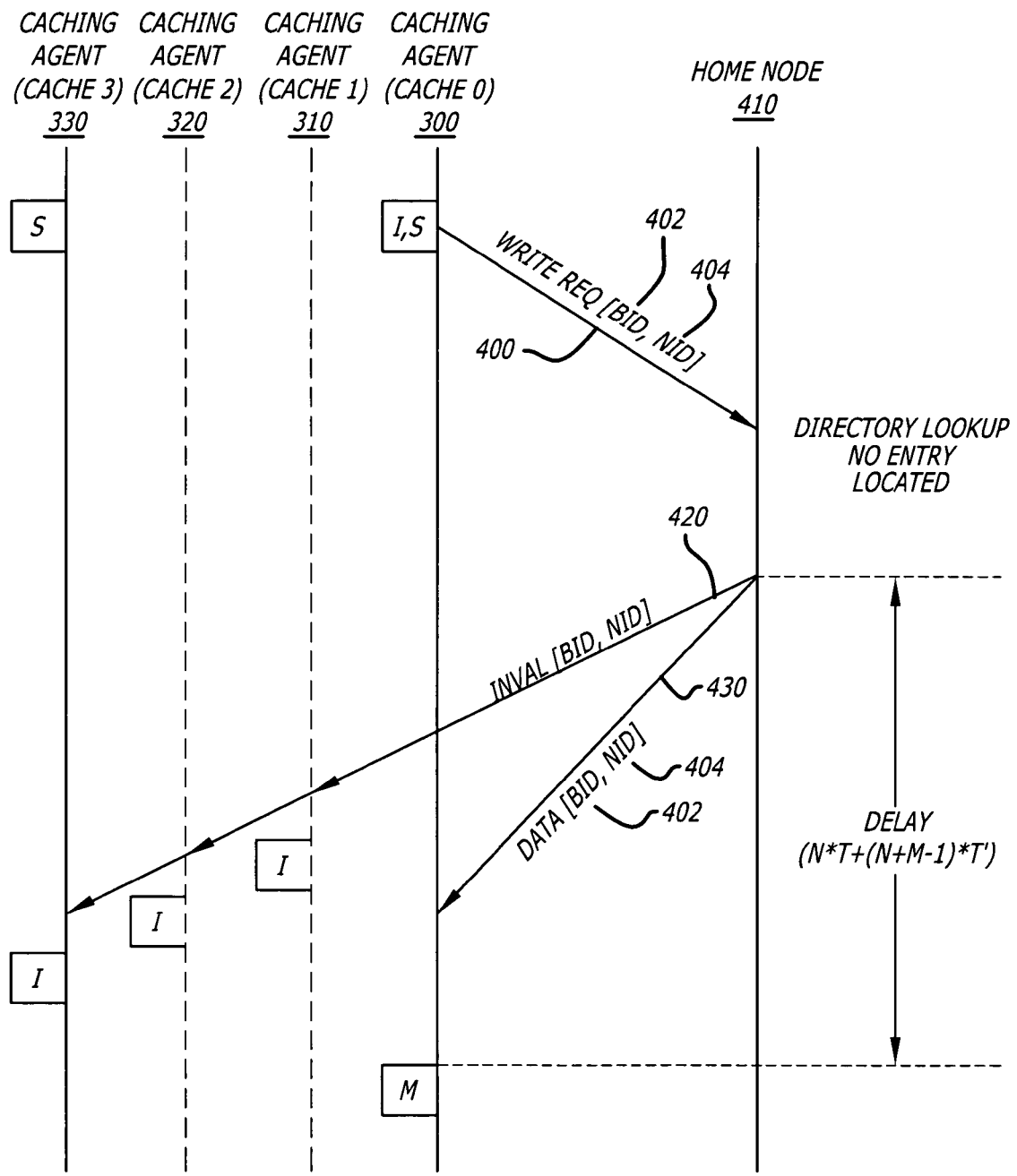
FIG. 4 is an exemplary flow diagram of a STORE Protocol in accordance with one embodiment of the invention.

Directory nodes $240_1$-$240_M$ are organized to maintain entries of protocol states for those cache blocks that are in a Modified (M) state, and not those cache blocks in a Shared (S) state or an Invalid (I) state. According to one embodiment of the invention, each directory node $240_1$, . . . , or $240_M$ is responsible for tracking protocol states for particular cached blocks, which are identified by the addresses of the blocks (or derivative of such addresses). For each distributed directory node such as distributed directory node $240_1$ for example, a protocol engine 242 operates to decode requests for data from caching agent $230_1$, . . . , or $230_N$ and, where appropriate, to place INVALIDATE and DATA messages on broadcast interconnect 220 in order to be observed by all of the caching agents $230_1$-$230_N$ as illustrated in FIG. 4.

It is contemplated that there does not need to be any correlation in number between the number of caching agent $230_1$-$230_N$ and distributed directory nodes $240_1$-$240_M$. As a result, "N" caching agents do not require "N" distributed directory nodes (where M=N), although system 200 may be implemented accordingly.

Figure 3:
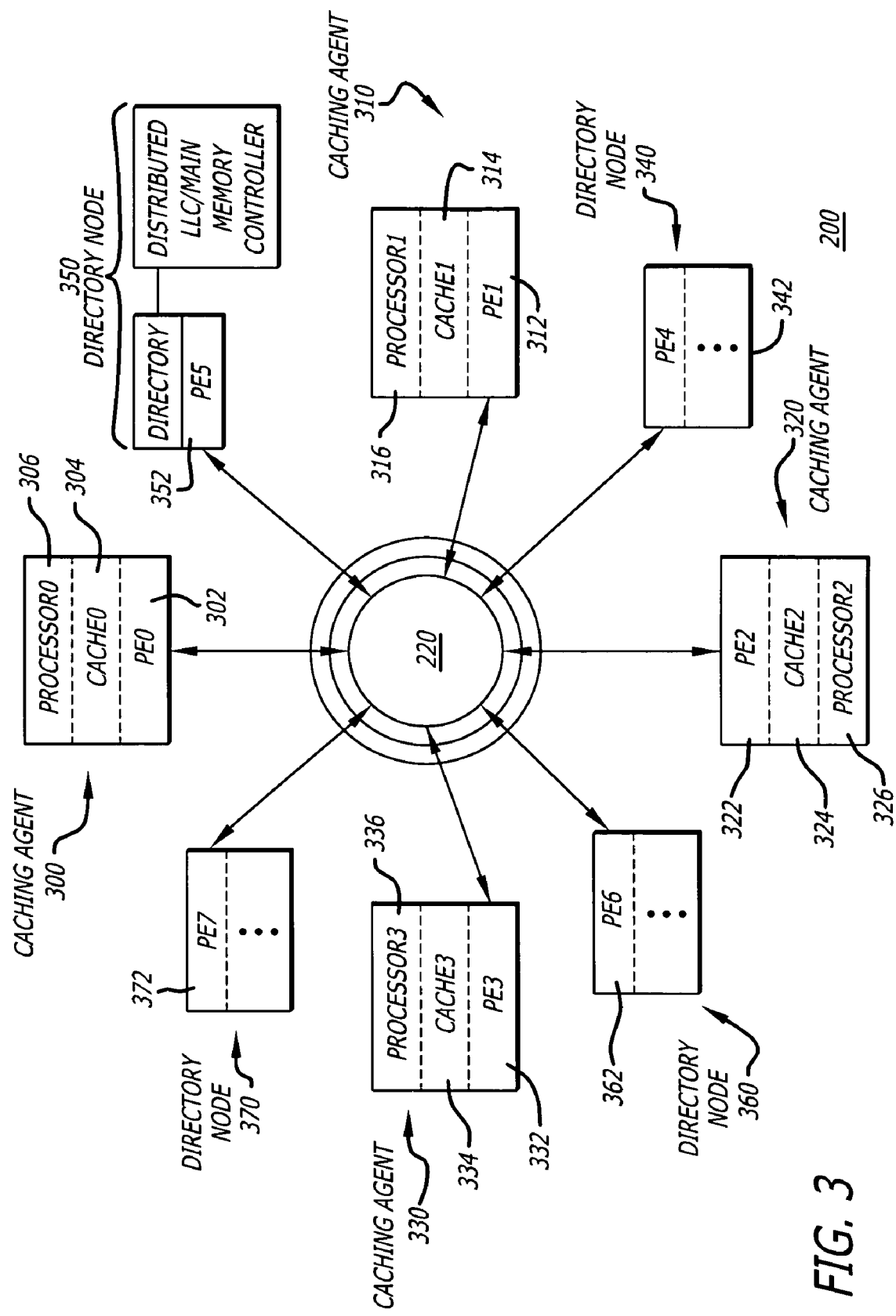
FIG. 3 is a more detailed exemplary block diagram of multiprocessor system of FIG. 2 in accordance with one embodiment of the invention.

Referring now to FIG. 3, a detailed exemplary block diagram of multiprocessor system 200 including four processors in communication with a ring-based interconnect and distributed shared address space with a directory is shown. Similar to the configuration of FIG. 2, multiprocessor system 200 include a plurality of nodes 210 in communication with each other over a broadcast interconnect 220. These nodes 210 include four caching agents 300, 310, 320 and 330 and four distributed directory nodes 340, 350, 360 and 370 each pertaining to a different memory address range.

As shown in FIG. 3, a first caching agent 300 includes a protocol engine (PE0) 302 in communication with broadcast interconnect 220 and a processor/cache complex such as processor (Processor0) 306 and a private cache (cache0) 304. Cache0 304 may be implemented as part of the same integrated circuit as processor0 306 or physically separate from processor0 306. Similarly, second, third and fourth caching agents 310, 320 and 330 include corresponding protocol engines (PE1, PE2, PE3) 312, 322, 332 in communication with broadcast interconnect 220 and processor/cache complexes 314/316, 324/326 and 334/336, respectively.

Distributed directory nodes 340, 350, 360 and 370 are accessible through protocol engines (PE4-PE7) 342, 352, 362 and 372 that are in communication with broadcast interconnect 220.

As shown in both FIGS. 3-4, when one of the caching agents 300, 310, 320 or 330 requests ownership of a cache block, a determination is initially made as to which of the plurality of directory nodes 340, 350, 360 and 370 constitutes the "Home node". In other words, a determination is made as to which directory node 340, 350, 360 and 370 is responsible for monitoring the protocol state information for the requested cache block. This determination may be conducted through a number of mechanisms, such as performing a one-way hash function on the address of the cache block to produce a hash value. The hash value, normally a fixed length output value, is used to identify which protocol engine 342, 352, 362 or 372 corresponds to the directory node responsible for the monitoring the protocol state information of the requested cache block.

Thereafter, the caching agent (e.g., caching agent 300) requests ownership of a cache block by transmitting a WRITE REQUEST message 400 to a Home node 410 (e.g., protocol engine "PE5" 352 and directory 350 of FIG. 3) as shown in FIG. 4. Herein, the requested cache block within caching agent 300 is in 'I' or 'S' state.

Home node 410 is responsible for verifying that the requested cache block is not currently owned by checking of the requested cache block is not exclusively owned (in the 'M' State). WRITE REQUEST message 400 includes an identifier of the cache block requested (hereinafter referred to as "BID") 402 and an identifier of the node (e.g., caching unit 300) granted ownership of the cache block (hereinafter referred to as "NID") 404.

In response to verification by Home node 410 that the cache block is not exclusively owned, an INVALIDATE message 420 is transmitted over an invalidate channel of broadcast interconnect 220 of FIG. 3 for observation by all of caching agents 300, 310, 320 and 330. INVALIDATE message 420 comprises BID 402 to identify the requested cache block and NID 404 to identify the caching agent granted ownership of the cache block (INVAL[BID, NID]).

Upon observing INVALIDATE message 420, each caching agents 310, 320 and 330 accesses its private cache to see if it has a copy of the requested cache block in a Shared state. If so, the caching agent invalidates the cache block in its private cache. For instance, caching agents 310, 320 and 330 are shown invalidating the cache block within their private caches.

For instance, as shown in FIG. 4, INVALIDATE message 420 is received by caching agent 300 after the average cycles identified in equation (7) above, and at most, waits a predetermined number of cycles after receipt of INVALIDATE message 420 before the requested memory block is moved to a 'M' state. The number of cycles depend on the type of nodes remaining after observation by caching agent 300, ranging between (N+M−k−1)*T+(N+M−k−1)*T' cycles and (N+M−k−1)*T'cycles.

A DATA message 430 comprising BID 402 and NID 404 (DATA[BID,NID]) is placed on a data channel by Home node 410 generally concurrent with the transmission of INVALIDATE message 420, which effectively places the most recent version of the requested block of information for storage by the caching agent.

As a result, the optimized STORE protocol reduces the overall transaction time by k*T'. For a multiprocessor system featuring 4 caching agents and 4 directory nodes as illustrated in FIG. 3, and the decode time (T') being approximately 2 cycles in duration, a saving of at least 16 cycles is achieved for each STORE flow. This results in a more efficient system since the cache block can be moved to an 'M' state with less latency than conventional STORE protocols.

Figure 5:
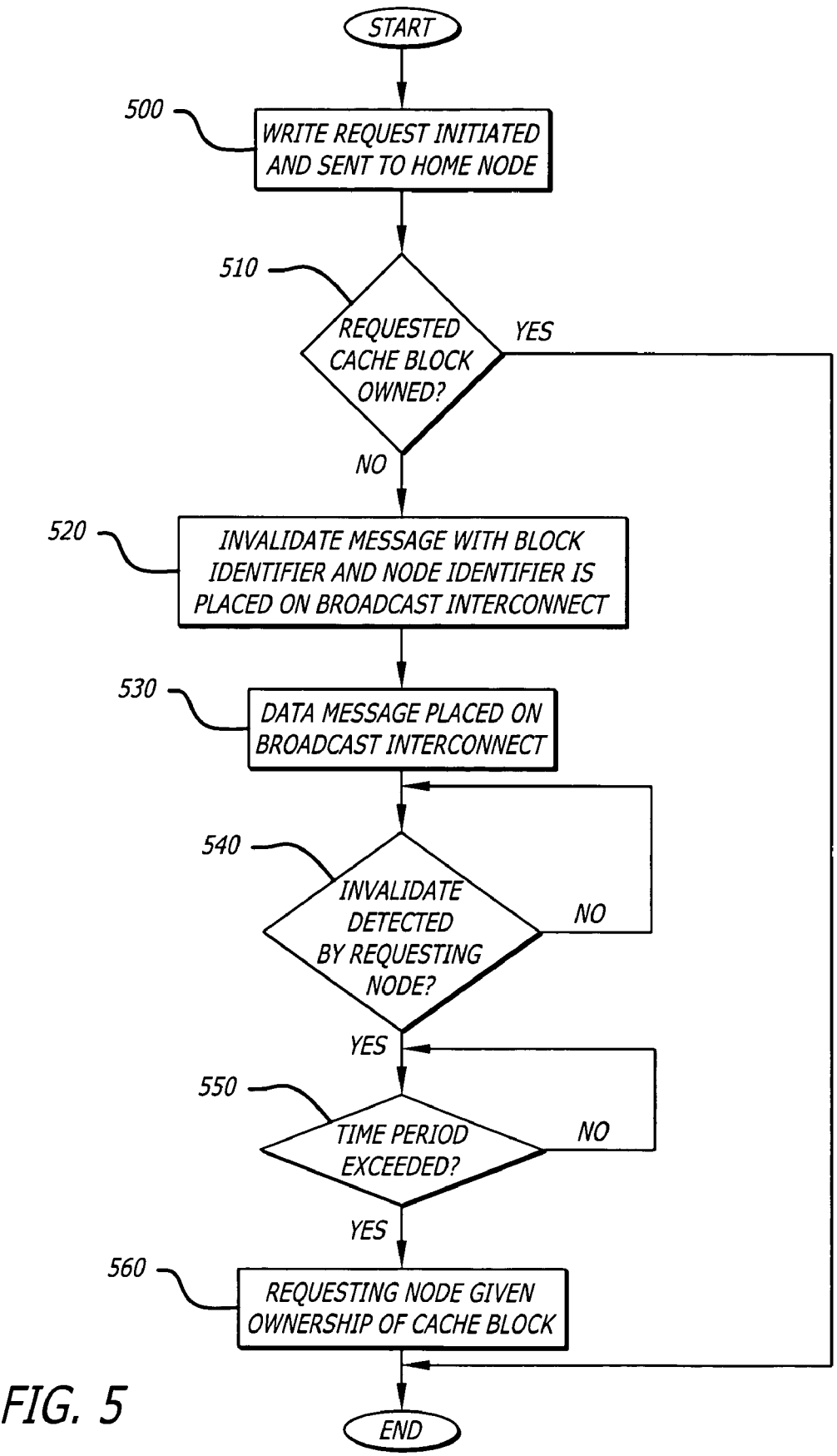
FIG. 5 is an exemplary flowchart of the STORE protocol in accordance with an embodiment of the invention.

Referring now to FIG. 5, an exemplary flowchart of the operations performed during the STORE protocol is shown. First, a WRITE REQUEST message is initiated by a requesting node and sent to a node responsible for monitoring a protocol state of various cache blocks (block 500). Both an identifier of the targeted cache block (BID) and an identifier of the node (NID) initiating the WRITE REQUEST message are provided with the WRITE REQUEST message. Thereafter, an entry associated with the WRITE REQUEST is accessed to determine if the requested cache block is already owned (block 510). If not, an INVALIDATE message is placed on the interconnect for observation by all nodes coupled to the interconnect (block 520). The INVALIDATE message includes BID and NID provided by WRITE REQUEST message. Likewise, a DATA message is placed on another channel and routed to broadcast interconnect for storage as the cache block (block 530).

Upon observation of INVALIDATE message by the requesting node, it is determined whether the number of cycles since the INVALIDATE message was transmitted exceeds a predetermined time period such as N*T+(N+M−1)*T', where "N" is equal to the number of caching agents, "M" is equal to the number of non-caching agents having PEs, "T" is the delay realized for processing a message (excluding decode), and "T'" is the delay realized for a decode operation by any of the nodes (blocks 540 and 550). If not, the requesting node continues to monitor for expiration of the predetermined time period. If so, the requesting node that initiated the WRITE REQUEST message now places the cached block into a 'M' state (block 560).

B. Optimized Store Protocol—Total Costs

The optimized STORE protocol further provides reduced costs for supporting barrier synchronization operations. As a concrete example, consider how the barrier synchronization latency is improved for the STORE protocol described above. A typical barrier synchronization algorithm would have the following form:

> NUM = no. of processors on the system
> VAR = barrier variable; // initially == 0
> Algorithm:
> lock_inc(&VAR)
> while (VAR! = NUM);

The lock movement operation causes any processor issuing the operation to acquire the cache block corresponding to the VAR variable in 'M' state. This variable VAR keeps track of the number of processors that have reached the barrier point. In a multiprocessor system, this operation, when executed on each processor would cause the VAR block to its private cache in 'M' state. In addition, executing the While statement would cause the cache block to be re-acquired in the 'S' state. The worst-case total ordering would have the processors having interleaved execution of lock_inc(&VAR), which would cause the cache block corresponding to VAR to go into 'I' state in all the other private caches, before re-acquiring the same in 'S' state due to the execution of the while loop.

For instance, as an illustrative example, suppose N processors need to hit the barrier. The first processor reaches the barrier and increments variable VAR to "1" by acquiring the corresponding cache block in M state. Since the barrier condition is not reached, it spins on the while loop. When the second processor hits the barrier, it gets the cache block in a 'M' state, hence invalidating the first processor, and increments VAR to "2". But the first processor keeps executing the spin loop, which causes the cache block to transition to 'S' state in both the processors. After some time, a third processor increment the variable VAR "3", but the spin-loops in the first and second processors again cause a transition to the 'S' state in all 3 processors. This process continues until all processor have hit the barrier, at which point the check in the while loop passes, and all processors make forward progress.

Therefore, the lock movement operation leads to a large amount of coherence traffic, with frequent transitions between 'M' and 'S' states. The optimized protocol for the ring interconnect would greatly reduce the cost of such kind of barrier synchronization operations where the total costs would be reduced to equation (8):

$$\text{Total Cost} = (N)*N*T + (N+M-1)*N*T'. \quad (8)$$

The total cost of the conventional barrier synchronization (assuming that NUM=N, the total number of processors in the system, "T" is the delay realized at each node including a protocol engine and "k" is the relative position of the requestor to the Home node along the interconnect).

$$\text{Total Cost} = N*N*T + N*(N+M-1)*T' + \sum_{K=1}^{N+M-1} k*t$$

Or, Total Cost = $N*N*T + N*(N+M-1)*T' +$ $$((N+M-1)*(N+M)*T')/2$$

-continued $$\text{Total Cost} = N*N*T + 0.5(N+M-1)*(3N+M)*T'.$$

$$\text{Cost Gain} = 0.5*(N+M-1)*(N+M)*T'$$

Where the costs for the optimized STORE protocol as discussed would not include the factor "kT" since the STORE protocol operates independent of the location of the requesting node and the costs associated with this factor, are costs involved in communications after the INVALIDATION message, the total cost of N*N*T+N*(N+M−1)*T' and a benefit of 0.5*(N+M−1)*(N+M)*T' cycles would be achieved.

While the invention has been described in terms of several embodiments of the invention, those of ordinary skill in the art will recognize that the invention is not limited to the embodiments of the invention described, but can be practiced with modification and alteration within the spirit and scope of the appended claims. The description is thus to be regarded as illustrative instead of limiting.

What is claimed is:

1. A method comprising:
    verifying that a cache block is not exclusively owned; and
    transmitting a message from a node to a broadcast interconnect, the message identifying both the cache block and a caching agent requesting ownership of the cache block and being an INVALIDATE message transmitted from a protocol engine associated with a directory to the broadcast interconnect coupling a plurality of caching agents including the caching agent, the INVALIDATE message identifying the caching agent.

2. The method of claim 1, further comprising:
    observing the message by a plurality of caching agents including the caching agent in communication with the broadcast interconnect; and
    placing a copy of the cache block in an Invalid state by each of the plurality of caching agents except for the caching agent.

3. The method of claim 1, wherein prior to verifying that the cache block is not exclusively owned, the method further comprises:
    determining the node, in communication with the broadcast interconnect, that provides access to a portion of a directory considered to know a state of the cache block; and
    transmitting a message requesting ownership of the cache block by the caching agent to the node.

4. The method of claim 3, wherein the node is a component including a protocol engine.

5. A method comprising:
    determining a node, in communication with a broadcast interconnect, that provides access to a portion of a directory considered to know a state of a cache block, the determining of the node includes conducting a one-way hash operation on an address of the cache block, to produce a hash value, the node being associated with the hash value;
    transmitting a message requesting ownership of the cache block by a caching agent to the node;
    verifying that the cache block is not exclusively owned; and
    transmitting a message from the node to the broadcast interconnect, the message identifying both the cache block kind a caching agent requesting ownership of the cache block.

6. The method of claim 1, wherein verifying of that the cache block is not exclusively owned includes conducting a directory look-up of protocol state information associated with the cache block.

7. The method of claim 1 further comprising:
    waiting a predetermined number of cycles after receipt of an INVALIDATE message before the requested caching agent gains ownership of the cache block.

8. The method of claim 7, wherein the predetermined time is equal to N*T+(N+M−1)*T', where "N" is equal to a total number of caching agents coupled to the broadcast interconnect and including the caching agent, "M" is a number of non-caching agent nodes coupled to the broadcast interconnect, "N+M" is equal to a total number of nodes, including the caching agents, coupled to the broadcast interconnect, "T" is a delay realized for processing a message by any one of the caching agents, and "T'" is a delay realized for a decode operation by any of the nodes.

9. A system comprising:
    a broadcast interconnect;
    a plurality of nodes coupled to the broadcast interconnect, the plurality of nodes including a first node to request ownership of a block of memory and a second node adapted to receive the request and access a directory to determine whether the cache block is exclusively owned, and if not exclusively owned, the second node to transmit an INVALIDATE message identifying both the cache block and the first node to the broadcast interconnect.

10. The system of claim 9, wherein first node being a caching agent and gaining ownership of the block of memory after a predetermined period of time has elapsed after transmission of the INVALIDATE message, the predetermined period of time being equal to N*T+(N+M−1)*T', where "N+M" is equal to a number of the plurality of nodes, "N" is equal to a total number of a first subset of the plurality of nodes that include the first node and every other node including a private cache, "T" is a delay realized for processing the INVALIDATE message by the first subset of nodes, "T'" is a delay realized for a decode operation performed by any of the plurality of nodes.

11. The system of claim 9, wherein the broadcast interconnect is a ring interconnect.

12. The system of claim 9, wherein the broadcast interconnect is a front-side bus.

13. The system of claim 9, wherein the first node is a caching agent including a processor, a cache memory, and a protocol engine in communication with the broadcast interconnect.

14. The system of claim 13, wherein the second node includes a protocol engine accessible to the directory.

15. The system of claim 9, wherein the first node to request ownership of the block of memory by
    determining to transmit a message requesting ownership of the cache block to the second node by conducting a one-way hash operation on an address of the cache block to produce a hash value and determining that the second node is to receive the message based on the hash value.

16. A method comprising:
    transmitting an INVALIDATE message by a node identifying both a cache block requested for ownership and a caching agent requesting ownership of a cache block to a ring interconnect; and
    placing the cache block in a Modified state by the caching agent after a predetermined amount of time has elapsed from transmission of the INVALIDATE message, the predetermined amount of time being independent of a physical placement of the caching agent on the ring interconnect.

17. The method of claim 16, wherein prior to further comprising:
   observing the INVALIDATE message by the caching agent and any other caching agent coupled to the ring interconnect.

18. The method of claim 16, wherein the predetermined amount of time is equal to N*T+(N+M−1)*T', where "N+M" is equal in number to a plurality of nodes coupled to the ring interconnect, "N" is equal to a total number of a first subset of the plurality of nodes that include all caching agents coupled to the ring interconnect including the caching agent, "M" is a number of non-caching agent nodes coupled to the broadcast interconnect, "T" is a delay realized for processing the INVALIDATE message by the first subset of the plurality of nodes, "T'" is a delay realized for a decode operation performed each of the plurality of nodes.

* * * * *

UNITED STATES PATENT AND TRADEMARK OFFICE
CERTIFICATE OF CORRECTION

PATENT NO. : 7,606,981 B2
APPLICATION NO. : 11/311751
DATED : October 20, 2009
INVENTOR(S) : Saha et al.

It is certified that error appears in the above-identified patent and that said Letters Patent is hereby corrected as shown below:

In column 9, at line 66 delete, "kind" and insert --and--.

Signed and Sealed this

First Day of June, 2010

David J. Kappos
*Director of the United States Patent and Trademark Office*

UNITED STATES PATENT AND TRADEMARK OFFICE
CERTIFICATE OF CORRECTION

PATENT NO. : 7,606,981 B2  Page 1 of 1
APPLICATION NO. : 11/311751
DATED : October 20, 2009
INVENTOR(S) : Saha et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 893 days.

Signed and Sealed this

Twelfth Day of October, 2010

David J. Kappos
*Director of the United States Patent and Trademark Office*